United States Patent [19]
Bull, Jr. et al.

[11] Patent Number: 5,552,457
[45] Date of Patent: Sep. 3, 1996

[54] PROCESS FOR MAKING A CARBON BLACK/RESIN MASTERBATCH

[75] Inventors: Charles L. Bull, Jr., North Lawrence; Howard A. Colvin, Tallmadge, both of Ohio

[73] Assignee: The Goodyear Tire & Rubber Company, Akron, Ohio

[21] Appl. No.: 526,351

[22] Filed: Sep. 11, 1995

[51] Int. Cl.$^6$ ................................. C08J 3/22; C08L 9/00
[52] U.S. Cl. ............................................. 523/351; 524/571
[58] Field of Search ........................... 523/351; 524/495, 524/496, 571

[56] References Cited

U.S. PATENT DOCUMENTS 3,674,736   7/1972   Lerman et al. ........................ 523/351

*Primary Examiner*—Peter A. Szekely
*Attorney, Agent, or Firm*—Alvin T. Rockhill

[57] ABSTRACT

By utilizing the process of the present invention a carbon black/resin masterbatch powder can be easily prepared on a commercial scale. This invention more specifically discloses a process for making a resin/carbon black masterbatch powder which comprises the steps of: (1) mixing the carbon black and the resin in an aqueous medium at an elevated temperature to produce an aqueous dispersion, with the proviso that the elevated temperature is above the melting point of the resin in the case of crystalline resins and with the proviso that the elevated temperature is above the softening point of the resin in the case of amorphous resins; (2) cooling the aqueous dispersion to a temperature which is below the melting point or the softening point of the resin; and (3) recovering the masterbatch powder from the aqueous dispersion. By utilizing the technique of this invention resin-composite particulates of syndiotactic-1,2-polybutadiene and carbon black can be easily prepared. Such resin-composite particulates are reported to be useful in making tire tread formulations which provide improved tire performance characteristics on ice and snow.

11 Claims, No Drawings

PROCESS FOR MAKING A CARBON BLACK/RESIN MASTERBATCH

BACKGROUND OF THE INVENTION

European Patent Publication No. 0,517,538 indicates that tire performance characteristics on ice and snow can be improved by incorporating resin-composite particulates of syndiotactic-1,2-polybutadiene and carbon black into tire tread formulations. European Patent Publication No. 0,517,537 also reports that tire performance characteristics on ice can be improved by such a technique. European Patent Publication No. 0,517,538 indicates that such resin-composite particulates can be made by kneading the syndiotactic-1,2-polybutadiene and the carbon black together in a laboratory plastomill at a temperature which is higher than the melting point of the syndiotactic-1,2-polybutadiene. However, such a mixing technique would be difficult to implement on a commercial scale.

SUMMARY OF THE INVENTION

By utilizing the technique of this invention resin-composite particulates of syndiotactic-1,2-polybutadiene and carbon black can be easily prepared. In fact, the process of this invention can be employed to make carbon black/resin masterbatch powders from a wide variety of resins without the need to employ a conventional mixer, such as a mill mixer or Banbury mixer. This accordingly eliminates the need for expensive mixing equipment and leads to a more consistent process which can be easily implemented on a commercial basis.

The process of this invention can be beneficially employed to make carbon black masterbatch powders from many types of thermoplastic resins, and from chemicals used in making rubber articles. For instance, reinforcing agents, tackifier resins, antidegradants, or other chemicals employed in rubber compounding can be used. Free flowing carbon black masterbatch powders can also be made utilizing resins which are liquids at room temperature, such as liquid tackifiers.

The subject invention more specifically discloses a process for making a resin/carbon black masterbatch powder which comprises the steps of: (1) mixing the carbon black and the resin in an aqueous medium at an elevated temperature to produce an aqueous dispersion, with the proviso that the elevated temperature is above the melting point of the resin in the case of crystalline resins and with the proviso that the elevated temperature is above the softening point of the resin in the case of amorphous resins; (2) cooling the aqueous dispersion to a temperature which is below the melting point or the softening point of the resin; and (3) recovering the masterbatch powder from the aqueous dispersion.

DETAILED DESCRIPTION OF THE INVENTION

The carbon black/resin masterbatch powder of this invention is made utilizing a very simple technique which can be easily implemented on a large scale commercial basis. The term powder as used herein includes material which is free flowing and which is in a particulate form or finely divided state. In the first step of the process of this invention the carbon black and the resin are mixed in an aqueous medium. The carbon black is amorphous carbon of quasi-graphitic form of small particle size. Any carbon black typically employed in rubber compounding can be used in the practice of this invention.

The resin can be virtually any type of thermoplastic resin. The resin could also be a rubber chemical, such as an antidegradant or a reinforcing agent. Free flowing carbon black masterbatch powders can also be made utilizing resins which are liquids at room temperature. For instance, the resin could be a liquid tackifier, such as Wingtack® 10 tackifier. Syndiotactic-1,2-polybutadiene can be employed as the resin in the process of this invention to make resin-composite particulates of the syndiotactic-1,2-polybutadiene and carbon black.

The weight ratio of the resin to the carbon black will normally be within the range of about 0.01:1 to about 4:1. The weight ratio of the resin to the carbon black will more typically be within the range of about 0.1:1 to about 1:1. In many applications it will be preferred for the weight ratio of the resin to the carbon black to be within the range of about 0.2:1 to about 0.8:1.

The aqueous medium utilized will typically be ordinary water. In most cases the water will be present in an amount which is sufficient for the resin and the carbon black to be the dispersed phase in the mixing step. In other words, the aqueous dispersion made in the first step will typically contain over 50 percent water. In most cases the aqueous dispersion made in the first step will contain over about 75 percent water.

The mixing in the first step of the process of this invention will be carried out at a temperature which is above the melting point or softening point (softening temperature) of the resin used. To insure that the resin is in the molten state the aqueous dispersion will typically be heated to a temperature which is somewhat above the melting point or the softening point of the resin. For instance, the aqueous medium could be heated to a temperature which is about 5° C. to about 40° C. above the melting point or softening point of the resin. It is not beneficial to heat the aqueous medium substantially above the melting point or softening of the resin since polymer degradation is more likely to occur at higher temperatures. For this reason it is typically preferred to heat the aqueous medium to a temperature which is about 10° C. to about 20° C. above the melting point or softening point of the resin. The term softening point as used herein means the temperature at which substances, such as amorphous polymers, without a sharp melting point change from viscous to plastic flow.

Sufficient agitation will be provided to thoroughly distribute the carbon black and the resin in the aqueous medium. The mixing step will preferably be carried out under an inert gas atmosphere to minimize polymer degradation. The inert gas atmosphere can be any gas which is not reactive with the resin. It will typically be a nitrogen atmosphere for economic reasons. However, a Noble gas, such as helium, neon, argon, or krypton, could also be used.

After the carbon black and the resin have been well distributed into the aqueous medium the aqueous medium is cooled to a temperature which is below the melting point or softening point of the resin. The masterbatch powder can then be recovered from the aqueous medium. For example, the solid product can be recovered from the aqueous medium by filtering the carbon black/resin powder from the water in the aqueous dispersion. The powder recovered can then optionally be washed with water or an organic liquid, such as alcohol. The powder is then normally dried to remove residual moisture. This can be accomplished by simply allowing the residual water to evaporate. The evaporation process can be facilitated by heating to an elevated temperature which is below the melting point or sticking point of the resin and/or by the application of vacuum. However, the temperature utilized should not be so high as to cause polymer degradation.

This invention is illustrated by the following examples which is merely for the purpose of illustration and are not to be regarded as limiting the scope of the invention or the manner in which it can be practiced. Unless specifically indicated otherwise, parts and percentages are given by weight.

EXAMPLE 1

In this experiment, free flowing resin-composite particulates of syndiotactic-1,2-polybutadiene and carbon black were prepared. In the procedure utilized 60 grams of N234 carbon black, 40 grams of syndiotactic-1,2-polybutadiene, and 500 ml of water were charged into a one liter autoclave. The syndiotactic-1,2-polybutadiene employed in this example had a melting point of 140° C. The autoclave was flushed with nitrogen and heated to a temperature of 150° C. The aqueous dispersion in the autoclave was stirred for 15 minutes. Then the autoclave was cooled to room temperature and a free flowing carbon black/syndiotactic-1,2-polybutadiene powder was filtered from the water. A transmission electron microscope was used to determine that individual particles of carbon black had been coated with the syndiotactic-1,2-polybutadiene.

EXAMPLE 2

In this experiment, free flowing resin-composite particulates of syndiotactic-1,2-polybutadiene and carbon black were prepared utilizing syndiotactic-1,2-polybutadiene which had a melting point of 170° C. In the procedure utilized 60 grams of N220 carbon black, 40 grams of the syndiotactic-1,2-polybutadiene, and 500 ml of water were charged into a one liter autoclave. The autoclave was flushed with nitrogen and heated to a temperature of 185° C. The aqueous dispersion in the autoclave was stirred for 15 minutes. Then the autoclave was cooled to room temperature and a free flowing carbon black/syndiotactic-1,2-polybutadiene powder was filtered from the water.

EXAMPLE 3

In this experiment a free flowing masterbatch powder of carbon black and Wingtack® 10 tackifier was made. In the procedure utilized 500 grams of carbon black and 1500 ml of water were charged into a one gallon (3.785 liter) autoclave. The autoclave was flushed with nitrogen and heated to a temperature of 80° C. while being stirred. Then 125 grams of the Wingtack® 10 tackifier was added to a quart (0.9464 liter) bottle which has previously been flushed with nitrogen and was preheated to a temperature of 80° C. The preheated tackifier was then added to the stirred autoclave at a steady rate over a 12 minute period. The aqueous dispersion in the autoclave was stirred for 15 minutes. Then the autoclave was cooled to room temperature and a free flowing tackifier/carbon black powder was filtered from the water.

EXAMPLE 4

In the procedure utilized in this experiment 75 grams of carbon black, 25 grams of an alkylphenol-acetylene tackifier resin (having a melting point of 130° C.), and 500 ml of water were charged into a one liter autoclave. The autoclave was flushed with nitrogen and heated to a temperature of 155° C. The aqueous dispersion in, the autoclave was stirred for 15 minutes. Then the autoclave was cooled to room temperature and a free flowing black powder was recovered from the water by filtration.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for making a syndiotactic-1,2-polybutadiene resin/carbon black masterbatch powder which consists of the steps of: (1) mixing the carbon black and the syndiotactic-1,2-polybutadiene resin in an aqueous medium at an elevated temperature to produce an aqueous dispersion, wherein the weight ratio of the syndiotactic-1,2-polybutadiene resin to the carbon black is within the range of about 0.01:1 to 0.8:1, with the proviso that the elevated temperature is about 5° C. to about 40° C. above the melting point of the syndiotactic-1,2-polybutadiene resin; (2) cooling the aqueous dispersion to a temperature which is below the melting point of the syndiotactic-1,2-polybutadiene resin; and (3) recovering the masterbatch powder from the aqueous dispersion.

2. A process as specified in claim 1 which further comprises drying the masterbatch powder.

3. A process as specified in claim 2 wherein the masterbatch powder is dried by evaporation.

4. A process as specified in claim 3 wherein step (1) is conducted under an inert gas atmosphere.

5. A process as specified in claim 4 wherein the weight ratio of the syndiotactic-1,2-polybutadiene resin to the carbon black is within the range of about 0.1:1 to about 0.6:1.

6. A process as specified in claim 5 wherein said inert gas atmosphere is a nitrogen atmosphere.

7. A process as specified in claim 6 wherein the mixing in step (1) is conducted at a temperature which is about 10° C. to about 20° C. above the melting point of the syndiotactic-1,2-polybutadiene resin.

8. A process as specified in claim 7 wherein the weight ratio of the syndiotactic-1,2-polybutadiene resin to the carbon black is within the range of about 0.2:1 to about 0.4:1.

9. A process as specified in claim 1 wherein the weight ratio of the resin to the carbon black is within the range of about 0.2:1 to about 0.8:1.

10. A process as specified in claim 9 wherein the mixing step (1) is conducted at a temperature which is about 10° C. to about 20° C. above the melting point of the syndiotactic-1,2-polybutadiene resin.

11. A process as specified in claim 10 wherein step (1) is conducted under an inert gas atmosphere.

* * * * *